(No Model.)
W. MARR.
EVAPORATING APPARATUS.
No. 389,160. Patented Sept. 4, 1888.
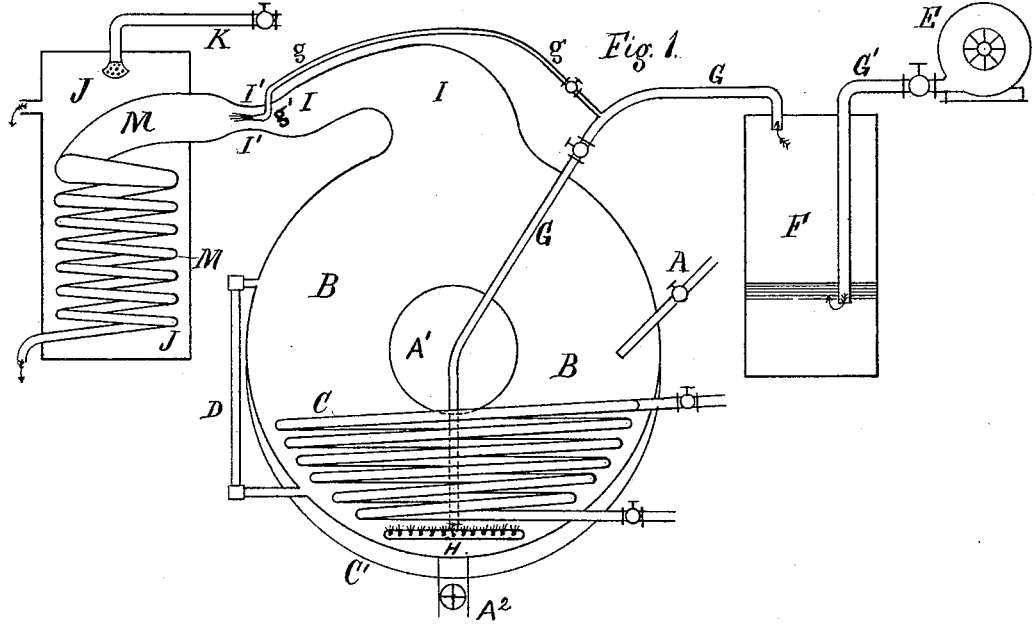
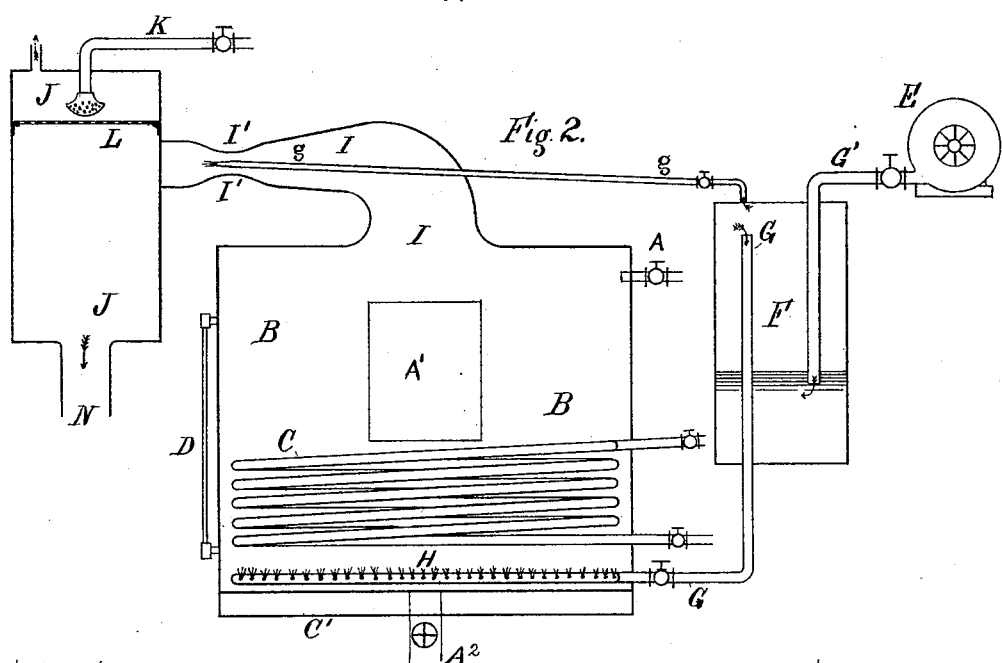
WITNESSES:-
C. H. Dutton
Wm. H. Weightman.
INVENTOR:-
William Marr

United States Patent Office.

WILLIAM MARR, OF NEW YORK, N. Y., ASSIGNOR OF ONE-HALF TO CHARLES K. DUTTON, OF SAME PLACE.

EVAPORATING APPARATUS.

SPECIFICATION forming part of Letters Patent No. 389,160, dated September 4, 1888.

Application filed July 16, 1887. Serial No. 244,475. (No model.)

*To all whom it may concern:*

Be it known that I, WILLIAM MARR, residing in the city, county, and State of New York, have invented certain new and useful Improvements in Evaporating Apparatus, of which the following is a specification, reference being had to the accompanying drawings.

My invention relates specially to the improvement of evaporators for the distillation of liquids or for the expulsion of moisture, dampness, or water from solids, fruits, vegetables, sirups, and such like, whereby the density or dryness of the liquid, material, or substance treated is increased.

The object of my improvements is economy in the cost and operation of the plant and improved results from such operation, due mainly to the low degree of temperature at which the evaporation is effected. Certain of my improvements consist in the special adaptation of means to the introduction and passing of cold air into, through, or about the liquors, solids, fruits, sirups, and such like, a contained portion of which is required to be evaporated while they are at a high degree of heat. They also consist in the combination and association of the several parts or portions of the apparatus, hereinafter shown and described.

Referring to the accompanying drawings, Figures 1 and 2 represent an evaporating plant embodying my improvements, the one providing for the preservation of the evaporated material as in distillation, the other for the dispersion of the vapor when of no special value. In Fig. 1 a vacuum-pan of ordinary construction, and also a condenser and pipe coil for close condensation and distillation, are represented as forming a portion of the evaporating plant. In Fig. 2 an ordinary closed chamber or apartment is represented as better adapted to the introduction of the material to be treated. The evaporating-chamber need not necessarily be closed, as for slow evaporation, the vapor may be allowed to escape to the atmosphere instead of being condensed and passed away as a liquid. An ordinary jet-condenser is represented in Fig. 2.

Similar letters of reference designate like parts in all the figures.

The letter A designates the inlet-pipe and valve for admitting liquors or sirups to the evaporating chamber or apartment B.

A' designates a door or man-hole, through which solids, fruits, vegetables, and the like are introduced into or removed from the evaporating chamber or apartment.

A² designates an outlet-pipe and valve, through which the treated liquor or sirup is withdrawn.

C designates the usual coil, and C' the usual steam-jacket used for heating the liquor within the pan or chamber.

D designates an ordinary glass gage for indicating the height of contained liquor while being treated.

E designates a blowing-engine or fan, by means of which cold air is introduced into the evaporating chamber or apartment.

F designates a cold-air receiver, clarifier, and accumulator having the pipe system G G' connected therewith. The receiver F is partially filled with water to form the clarifier, and the pipe G', extending from the blowing-engine E, passes below the water-level. The air is forced to pass through the water and be cleansed of dust and foreign matter. It accumulates in the upper portion of receiver F, whence it passes through pipe system G G' to a perforated coil, H, at the bottom of the evaporator-chamber B, whence it is discharged to mingle with the liquid or material to be vaporized or dried.

In the ordinary manipulation of this apparatus the temperature of the liquor or material to be treated is raised to 200° to 212° Fahrenheit, when cold air is admitted and the temperature drops to an average of 125° to 150°, the most efficient temperature for successful evaporation.

*g* designates a special branch pipe for transmitting a portion of the cold air direct to a contracted neck, I', in the exhaust-outlet or goose-neck I, through which the vapor passes as it is formed. This blast of cold air at the neck I' assists in the forced discharge of the vapor from the evaporator chamber or apartment. It is specially used where hasty vaporization and discharge are desired. With slow evaporation it is hardly necessary.

J designates a condenser for liquefying the vapor after its discharge from the evaporator chamber or compartment.

K designates a pipe and rose-outlet for the admission of cold water to the condenser for purposes of condensation.

L designates a scattering-plate within the condenser for open condensation.

M designates a coil within the condenser for closed condensation and distillation.

N designates a discharge outlet for waste material in the open condenser.

In the regular operation of this improved apparatus for liquor evaporation and distillation the cold air is forced through the pipes G G', and discharged from the perforated outlet or coil H into the hot liquid, causing mechanical ebullition to assist the effect of the heat applied. As the cold air passes through the heated liquor, it absorbs heat and moisture and, expanding, carries the moisture upward with it and passes out through the gooseneck to the condenser for liquefaction and preservation. To assist this operation the special blast-outlet at I' in the goose-neck is provided. This new supply of air takes up a portion of the vapor passing from the evaporator, renders the mass of vapor less dense, and assists in the free movement of the whole to the condenser.

For taking water, moisture, or dampness from fruits, vegetables, and other solids, the cold air mingles with the heated surrounding air, relieves it of a portion of its vapor, and develops a current through and out of the evaporator chamber or apartment and its connecting goose-neck to the condenser, where the vapor is condensed and run out through discharge N.

What I claim as new, and desire to secure by Letters Patent, is—

1. In an evaporating apparatus, the combination, with the evaporator chamber or apartment B, having exhaust-pipe or goose-neck I, of heater coil or pipe C, blowing-engine or fan E, accumulator and clarifier F, cold-air-pipe system G, cold-air-discharge pipe or coil H, condenser J, and cold-water pipe K, substantially as and for purposes specified.

2. In an evaporating apparatus, the combination, with the evaporator chamber or apartment B, having exhaust-pipe or goose-neck I, of heater coil or pipe C, blowing-engine or fan E, accumulator and clarifier F, cold-air-pipe system G, cold-air-discharge pipe or coil H, condenser J, and closed coil M, substantially as and for purposes specified.

3. In an evaporating apparatus, the combination of the blowing-engine or fan E, pipe system G G', accumulator F, evaporator chamber or apartment B, having a contracted goose-neck, and the branch cold-air pipe $g$, discharging into the contracted portion of the goose-neck I, substantially as and for purposes set forth.

4. In an evaporating apparatus, the combination of the blowing-engine or fan E, accumulator F, cold-air-pipe system G G', cold-air-discharge pipe or coil H, heater coil or pipe C, evaporator chamber or apartment B, having a contracted goose-neck, and the branch cold-air pipe $g$, discharging into the contracted portion of the goose-neck I, substantially as and for purposes set forth.

5. In an evaporating apparatus, the combination of the blowing-engine or fan E, accumulator or clarifier F, cold-air-pipe system G G', cold-air-discharge pipe or coil H, heater coil or pipe C, evaporator chamber or apartment B, having a contracted goose-neck, branch cold-air pipe $g$, discharging into the contracted portion of the goose-neck I, condenser J, and cold-water-supply pipe K, substantially as and for the purposes set forth.

WILLIAM MARR.

Witnesses:
C. K. DUTTON,
WM. H. WEIGHTMAN.